Oct. 30, 1923.  
E. THOMSON  
ELECTRIC HEATER  
Filed March 15, 1921  
1,472,504  
3 Sheets-Sheet 1

Inventor,  
Elihu Thomson  
by Albert G. Davis  
His Attorney.

Oct. 30, 1923.

E. THOMSON

ELECTRIC HEATER

Filed March 15, 1921    3 Sheets-Sheet 2

1,472,504

Inventor,
Elihu Thomson
by Albert G. Davis
His Attorney.

Oct. 30, 1923.

E. THOMSON

ELECTRIC HEATER

Filed March 15, 1921    3 Sheets-Sheet 3

1,472,504

Inventor,
Elihu Thomson,
by His Attorney.

Patented Oct. 30, 1923.

1,472,504

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

ELECTRIC HEATER.

Application filed March 15, 1921. Serial No. 452,474.

*To all whom it may concern:*

Be it known that I, ELIHU THOMSON, a citizen of the United States, residing at Swampscott, county of Essex, State of Massachusetts, have invented certain new and useful Improvements in Electric Heaters, of which the following is a specification.

My invention relates to electric heaters and has for its object the provision of an improved device of this character.

More specifically my invention relates to electric induction heaters for steel tires although it can readily be utilized in the heating of many articles which form in whole or in part a closed loop of electrical conducting material in which heating currents can be induced.

In the manufacture or repair of wheels of various kinds, particularly for railway cars and locomotives, it is the practice to make the tire slightly smaller than the wheel or hub over which it is to be fitted. The tire is then heated until it has expanded sufficiently to be easily slipped on the wheel where it is shrunk tightly in place by cooling. My invention is particularly adapted to the heating of tires for this purpose.

The method heretofore employed in heating tires has been to arrange a circular fire to play upon the tire. This method is attended with great difficulty in heating the tire uniformly, at the same time it is very inefficient due to the large amount of heat wasted, the smoke and soot during both the heating and the handling of the tire are a nuisance, and the radiated heat makes it impossible to go near the tire while it is being heated without suitable protection from radiation.

In carrying out my invention I employ in the particular arrangement which I have illustrated a plurality of magnetic flux circuits interlinking with the tire and a heat insulating casing for inclosing the tire during the heating operation.

Figure 1:
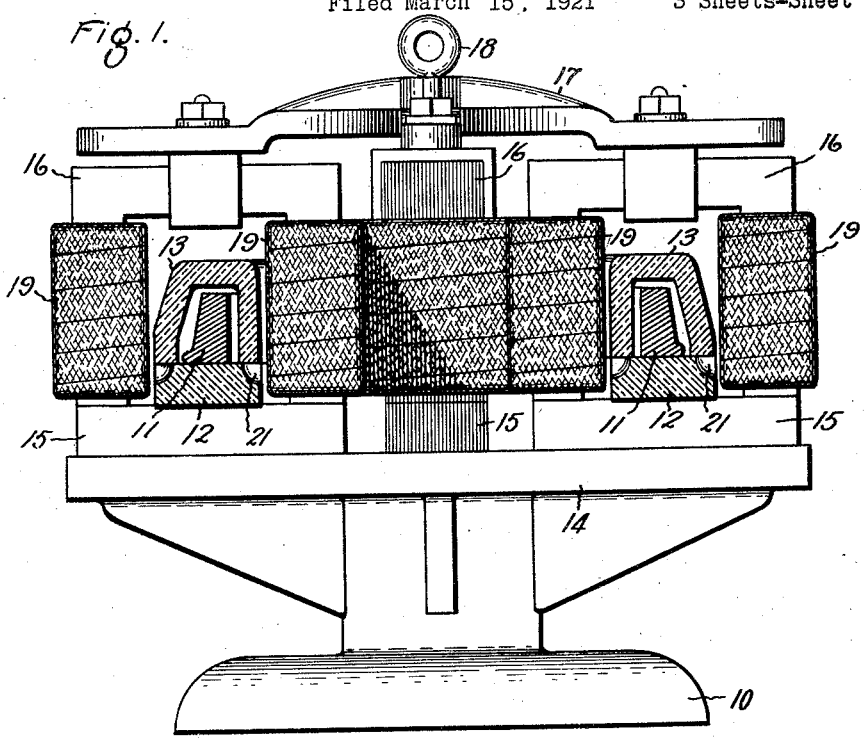
Figure 2:
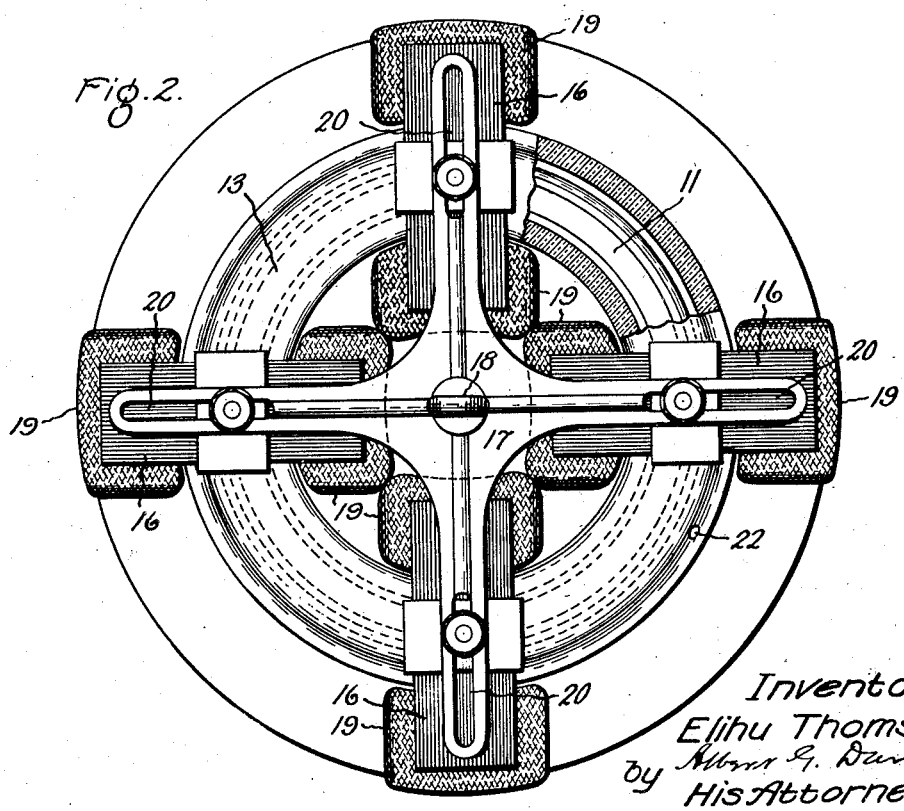
Figure 3:
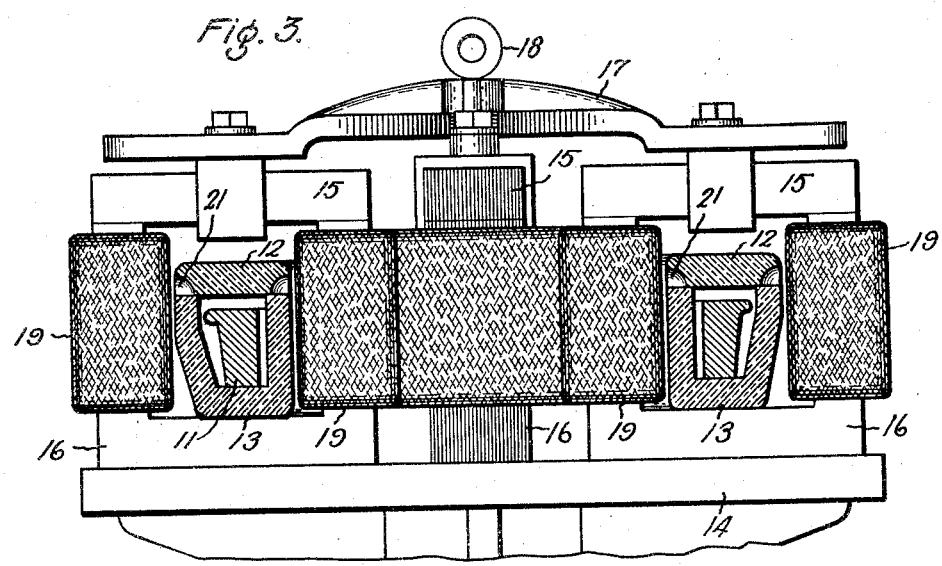
Figure 4:
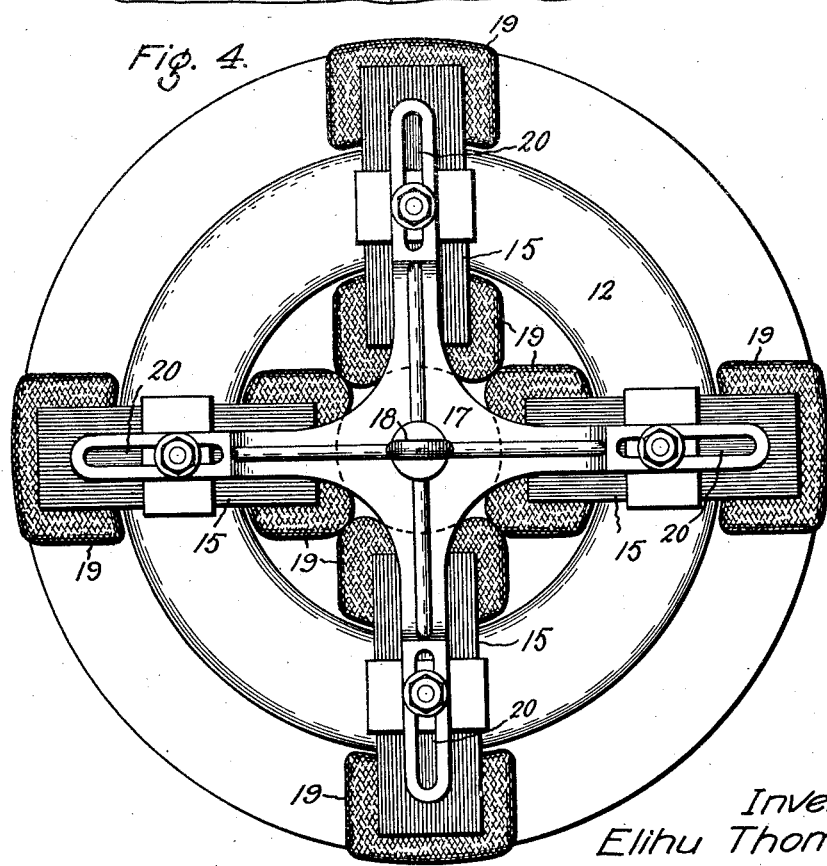
Figure 5:
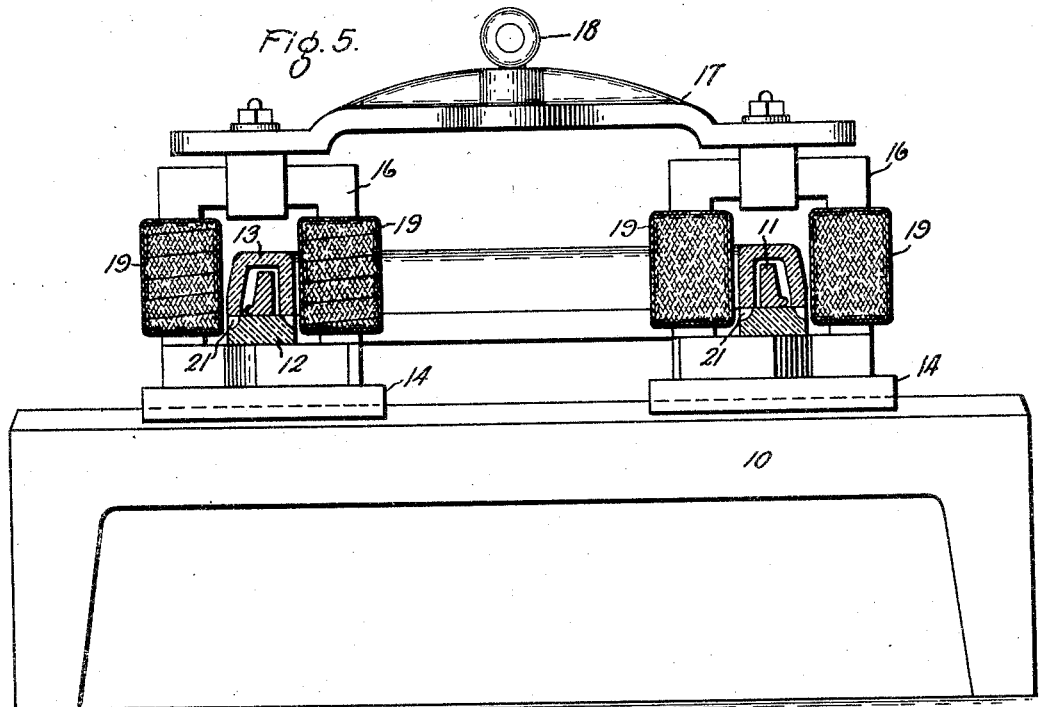
Figure 6:
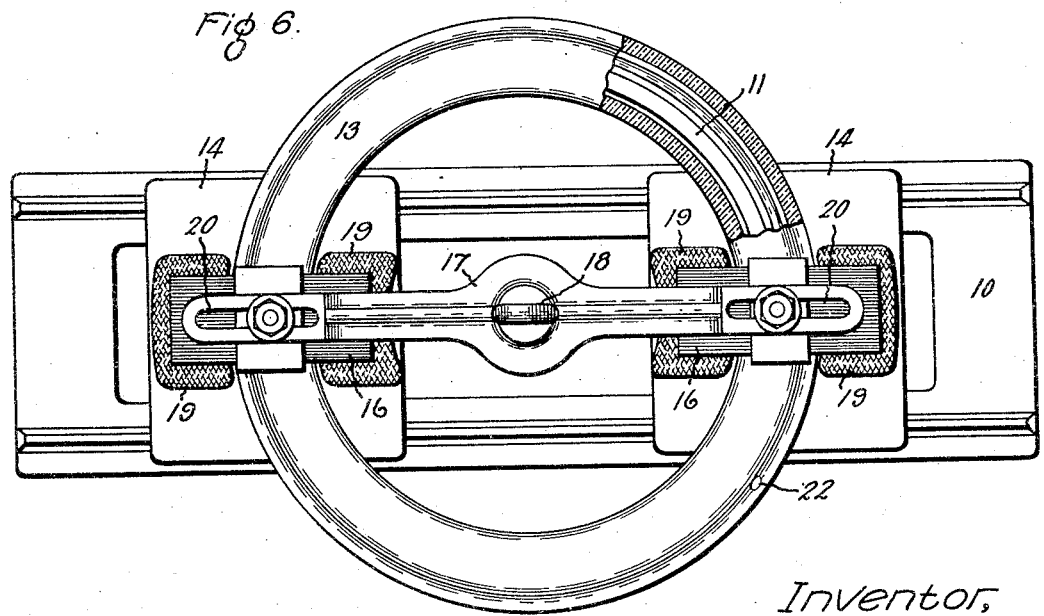

In the accompanying drawings. Fig. 1 is an elevation view partly in section of an induction heater embodying my invention; Fig. 2 is a plan view of the apparatus shown in Fig. 1; Fig. 3 is an elevation view partly in section of a modified form of my invention; Fig. 4 is a plan view of the apparatus disclosed in Fig. 3; and Fig. 5 is an elevation view partly in section of another modified form of my invention of which Fig. 6 is a plan view.

Referring to Figs. 1 and 2 of the drawings, the tire or other work piece 11 which it is desired to heat is placed on an annular slab member 12 which rests on four radially extending magnetic core arms 15 of laminated iron. A suitable supporting table 14 having a base 10 is provided for the arms 15 to which they may be fastened in a convenient manner. The tire is completely inclosed in a jacket by means of a suitably fitting annular cover or cap 13 which is placed on the slab 12 so that a closed annular chamber is formed around the tire. Cavities 21 are provided in the slab 12 to permit the application of hooks or other lifting means to the cover 13. The slab 12 and cover 13 are made of a suitable heat insulating and electrically non-conducting material which is strong enough to be handled, for example, reinforced concrete. Co-operating with each of the radial arms 15 so as to form therewith a closed magnetic core interlinking with the chamber is an inverted U shaped member 16 of laminated iron. Each arm of member 16 carries an energizing coil 19. The core members 16 are adjustably attached to a spider member 17 having an eyebolt 18 by means of which the spider, with the core members 16 and coils 19, can be lifted as a unit. In the ends of the spider arms are slots 20 by means of which the cores 16 are suitably attached to the spider so that they can be adjusted in a radial direction to correspond to different sizes of tires. A set of jacketing members 12 and 13 may be provided for each size of tire.

It will be noted that the center of gravity of the tire is below the center of gravity of the coils 19. The object in arranging the coils and tire in these relative positions is to generate a downwardly directed inductive repulsion force which tends to hold the tire more firmly to its seat. If the tire were placed above the center of gravity of the coils there would be a repulsion force in the opposite direction tending to lift the tire from its seat.

With the apparatus thus constructed and arranged, in order to start the heating operation a circuit is closed thru the coils 19 from an alternating current supply source, when a strong magnetic flux will be set up by the coils in each of the flux circuits formed by the co-operating magnetic core parts 15 and 16. The tire will be the closed secondary of a transformer of which the sets of coils 19 are the primaries, and electric currents will be induced in the tire of sufficient strength to quickly heat it. Loss of heat is prevented by the heat insulating jacket surrounding the tire. When the tire is heated to the desired temperature, which can be determined by observing the tire through a sight hole 22 in the heat insulating jacket, the current is cut off and the whole upper structure comprising the spider, core members 16, and the coils is lifted off by means of eyebolt 18. The cover or cap 13 is then removed thus uncovering the tire which can now be lifted by suitable hooks or chains and applied to the wheel where it is cooled causing it to shrink tightly in place on the wheel.

During the heating operation the temperature of the tire will be increased uniformly, there will be but little heat wasted due to to the heat insulating jacket inclosing the tire, the tire can be inspected during the heating operation without discomfort, and the entire procedure is further characterized by neatness, dispatch, cleanliness, and freedom from smoke and cinders.

The energizing coils 19 can be connected in series or in parallel to the supply circuit as desired, but they must be so connected to the supply circuit that they will be energized in a direction to cooperate with each other in inducing the heating current in the tire.

Referring to Figs. 3 and 4 showing a modified form of my invention, the coils 19, core parts 15 and 16, the tire, and the heat insulating jacket are in inverted relation with respect to the apparatus shown in Figs. 1 and 2.

In this arrangement the coils and receptacle 13 are stationary while core parts 15, which are adjustably attached to the spider, can be lifted by means of eyebolt 18. The tire is placed in the inverted cover 13, and the slab 12 then put in place to form a closed, heat insulated chamber around the tire. In this arrangement the cavities 21 in the slab 12 are for convenience in applying lifting means to the slab itself. In this modification, also, of my invention the center of the tire is below the centers of coils 19 for the purpose of utilizing the inductive repulsion force to hold it more firmly to its seat. When the tire has been heated to the desired temperature the spider, carrying core members 15, is removed by means of eyebolt 18. The slab 12 is then removed exposing the tire which can be lifted and applied to the wheel as previously described in connection with Figs. 1 and 2.

In Figs. 5 and 6 is shown a modified form of my invention providing a convenient adjustment for heating different sizes of tires. The base 10 is in the form of a lathe bed upon which the tables or supports 14 are slidably mounted so that they can be moved toward or away from each other. The transformer elements comprising cores 16 and coils 19 can be slidably adjusted in slots 20 in the lifting member 17 to corresponding positions. Various sizes of heat insulating, jacketing parts 12 and 13 may be provided to match each size of tire. Obviously this arrangement can be varied to provide for the use of more than two sets of energizing coils if desired.

Various modifications of my invention will occur to those skilled in the art. The number of magnetic flux circuits, and energizing coils thereon, may be varied at will to change the heating characteristics of the apparatus, a suitable lifting member being provided. The heat insulating jacket may be so designed that its size can be changed to suit the size of the workpiece, for example, by making it in sections which can be fitted together and added or taken away to match the size of the workpiece.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is,—

1. In an induction heater, the combination with a workpiece forming a closed loop of electrically conducting material, of a plurality of magnetic core members forming a plurality of closed magnetic flux circuits interlinking with said workpiece, energizing coils for said magnetic flux circuits having their centers above the center of said workpiece, and means for opening the magnetic flux circuits so that the workpiece can be removed.

2. In an induction heater, the combination with a steel tire, of a plurality of symmetrically arranged stationary magnetic core members adapted to be adjusted radially, a lifting member provided with radial slots, movable magnetic core members mounted in said slots so as to be adjustable to cooperate with the stationary core members and form therewith a plurality of closed magnetic flux circuits interlocking with said tire, and energizing coils on said core members.

3. In an induction heater, the combination with a workpiece forming a closed loop of electrically conducting material, of a closed magnetic flux circuit interlinking with said workpiece, an energizing coil for said magnetic flux circuit positioned so as to inductively hold the workpiece to its seat, and means for opening the magnetic flux circuit so that the workpiece can be removed.

4. An induction heater for steel tires comprising an annular heat insulating jacket forming a chamber for inclosing the tire during the heating operations, a plurality of stationary magnetic core members arranged to be adjusted radially, a lifting member, movable magnetic members adjustably attached to the lifting member so as to cooperate with said stationary core members and form therewith a plurality of closed magnetic flux circuits interlocking with said chamber, and energizing coils on said core members.

5. The combination in an induction heater for steel tires of an annular slab of heat insulating material, an annular receptacle of heat insulating material adapted to cooperate with the slab to form an annular heat insulating chamber for inclosing the tire during the heating operation, a plurality of radially adjustable stationary magnetic core members, a lifting member provided with radial slots, movable magnetic core members mounted in said slots so as to be adjustable to cooperate with the stationary core members and form therewith a plurality of closed magnet flux circuits interlinking with said chamber, and energizing coils on said core members, the chamber and the coils being so arranged that the centers of the coils are above the center of the tire.

In witness whereof I have hereunto set my hand this tenth day of March, 1921.

ELIHU THOMSON.